United States Patent [19]

Peters et al.

[11] 3,979,370

[45] Sept. 7, 1976

[54] METHOD FOR SIMULTANEOUS ADDITION OF NON-COMPATIBLE SUBSTANCES TO A MIXING ZONE

[75] Inventors: Edwin F. Peters, Winfield; James L. Jezl, St. Charles, both of Ill.

[73] Assignee: Standard Oil Company (Indiana), Chicago, Ill.

[22] Filed: Apr. 16, 1975

[21] Appl. No.: 568,599

[52] U.S. Cl. .................................. 526/348; 526/4; 526/19; 526/351; 526/352; 526/88; 528/480
[51] Int. Cl.[2] ........................ C08J 3/00; C08J 3/20; C08F 10/02; C08F 10/06
[58] Field of Search ...... 260/93.7, 94.9 F, 94.9 GD, 260/88.2 S

[56] References Cited

UNITED STATES PATENTS

| | | |
|---|---|---|
| 3,254,041 | 5/1966 | De Pierri, Jr. et al. ...... 260/94.9 GD |
| 3,773,743 | 11/1973 | Ainsworth, Jr. et al. .... 260/94.9 GD |
| 3,848,027 | 11/1974 | Forbess et al. .............. 260/94.9 GD |
| 3,923,760 | 12/1975 | Mullikin et al. ................. 260/94.9 F |

*Primary Examiner*—Alan Holler
*Attorney, Agent, or Firm*—Wallace L. Oliver; Arthur G. Gilkes; William T. McClain

[57] ABSTRACT

Simultaneous precise addition of a plurality of non-compatible substances to a mixing zone is achieved by forming a dispersion containing the non-compatible substances and subsequently injecting the dispersion into such zone.

7 Claims, No Drawings

METHOD FOR SIMULTANEOUS ADDITION OF NON-COMPATIBLE SUBSTANCES TO A MIXING ZONE

BACKGROUND OF THE INVENTION

Our invention relates to the addition of precise amounts of a plurality of non-compatible substances into a mixing zone. More specifically, our invention relates to adding polymer additives and catalyst deactivation agents into a monomer polymerization process.

In a variety of chemical processes a plurality of substances must be added to a mixing zone in precise amounts during the operation of the process. If the various substances are compatible with each other, that is, soluble in each other or a common solvent, a simple solution of these substances may be injected into the mixing zone. However, if the substances are non-compatible with each other, substantial difficulties are encountered. For example, if some non-compatible substances are soluble only in an organic solvent while others are insoluble in such solvents, a traditional method of adding these types of materials to a mixing zone is to inject each substance separately. This method of multiple input streams can lead to problems in metering and controlling the precise amount of each substance entering the zone. In addition, insoluble components cannot be easily added by this method. Since the amounts of each entering component may vary over the course of a process or between different runs of the process, a non-uniform product can result. Further, since each substance, which may or may not react chemically with other materials present, is being added separately, incomplete mixing can occur with all reactive species present in the zone, thus causing an inefficient process of non-uniform product. Although the non-compatible substances can be liquids or even gases, these problems are especially acute when one or more of the entering substances is a solid.

More specifically, in monomer polymerization processes such as the catalytically promoted polymerization of alpha-olefins including ethylene, propylene and copolymers thereof, additives such as a polymer stabilization package, coloring agents, and a catalyst kill and/or deactivation package are added usually during the later stages of the process. The exact point of addition in the process will vary from process to process with the preferred addition point being established by those skilled in the art. These polymer additives and catalyst deactivation agents are liquids, solids and sometimes gases, and can vary from soluble to insoluble in water or in organic solvents. Since there is no single solvent that will sufficiently dissolve all of the required components in such processes, the current practice is to inject these additives and agents into the reaction process through multiple input streams, or to add them in master batches in powder form. In either of these methods, it is difficult to meter the additions with precision and especially it is extremely difficult to add solids to a polymer in a melting zone.

The general object of our invention is to provide a method of simultaneously injecting controlled amounts of a plurality of non-compatible substances into a mixing zone. Another object is to provide a composition in which a plurality of non-compatible substances may be carried into a mixing zone. A specific object of our invention is to provide a method of introducing polymer additives and catalyst deactivation agents into a monomer polymerization process. Other objects will appear hereafter.

SUMMARY OF THE INVENTION

Our invention is a method for introducing a plurality of non-compatible substances into a mixing zone comprising the steps:
a. forming a stable dispersion in which the non-compatible substances are incorporated; and
b. injecting the dispersion into the mixing zone.

DESCRIPTION OF THE INVENTION

Briefly, our invention is to form a stable dispersion or grease that incorporates a number of substances, such that the dispersion can be injected into a mixing zone. In the case of a monomer polymerization process, polymer additives and catalyst deactivation agents may be added simultaneously into the process stream, including at a point where the polymer is molten, by injecting a stable liquid emulsion formed from a hydrocarbon portion, a water portion and an emulsifying agent along with the requisite additives and/or agents.

The basic theory of dispersions and suitable examples thereof are presented in Volume 8, pages 117–154 of Kirk-Othmer, Encyclopedia of Chemical Technology, 2d Edition (1965) which is incorporated herein by reference. Generally, a stable liquid dispersion contains a dispersed or internal phase which is surrounded by a continuous or external phase. In our invention the substances which are required in a mixing zone can be one or both of these phases or substances incorporated within the phases or emulsifying agents situated between the phases. By stable liquid dispersion we include emulsions (liquid in liquids), suspensions (solids in liquids), foams (gases in liquids) and combinations thereof. Typically a dispersion is formed by rapid blending of the desired components, after which a stable dispersion should not separate readily into non-homogenous phases before injection into a mixing zone. The preferred dispersion is of the water-oil type and most preferably is a water in oil system in which other substances (liquids, solids or gases) can be present either in solution or in discrete phases. For example, a typical dispersion of our invention would be a water-oil emulsion in which solid particles are suspended and in each phase of which either oil or water soluble compounds are dissolved. In this manner a variety of non-compatible substances can be combined in one composition before addition into an overall process stream. Alternatively, a stable suspension can be formed from a polymer additive package and either water or a hydrocarbon alone. In these cases, the components of the additive must either be somewhat compatible with the dispersing medium or be associated with some type of surfactant which allows a stable dispersion to form.

The substances which are introduced into the mixing zone in one dispersion composition can have a variety of functions. For example, in a water-oil dispersion, the water may be a reactant which combines with other substances which are present in the mixing zone. A specific example is the use of water to deactivate metal containing (e.g. Ziegler-Natta type) catalyst which is present after catalytic polymerization of ethylene, propylene or copolymers thereof. Within either primary phase of an oil/water dispersion can be included other substances which must be added to a mixing zone. For example, polymers of ethylene or propylene usually contain oxidation inhibitors which can be added simultaneously with the catalyst deactivation agent. Our invention easily permits such simultaneous precise addition. The oil phase can be completely inert in the overall process or can function as lubricant, a process aid or a product property improver.

In the case of solids, the particles should be in as small a size as practicable. If the solid particle size is not small enough, we encounter difficulties in pumping the resulting emulsion, although other methods can be used such as water displacement. Ball milling has been found to be an effective method of producing small size particles. Other methods include ultrasonic dispersion and precipitation from solution by an anti-solvent.

In order to form a stable oil/water dispersion an emulsifier usually is employed. Typically our emulsifying compound has hydrophilic and lipophilic moieties and can be characterized by the relative simultaneous attraction of an emulsifier for water or for oil and quantified by the Hydrophile-Lipophile Balance (HLB) number. The relative amounts of each component of a dispersion can be determined by the type of emulsifier used. In an oil/water system, the greater the HLB value (i.e. the greater the hydrophilic character) the greater is the amount of water that will be incorporated within the resulting stable oil/water emulsion. There are many emulsifiers available commercially of widely varying characteristics and, depending upon the specific application contemplated, those skilled in the art can choose an appropriate agent. Since in our invention it can be important to contain within the dispersion the correct proportion of reactants, a dispersion system must be determined that will yield the proper amounts of internal and external phases while allowing for the presence of other substances within the two primary phases. Such can be accomplished by simple experimentation using varying concentrations of internal and external phases and employing various emulsifiers. In many cases the relative proportion of the primary phase is not critical and thus there is more flexibility in choosing the constituents that can be used. Within the skill of the art is the ability to alter the physical characteristics of the dispersion e.g. viscosity) by altering the relative concentrations of its constituents.

Our invention especially is suited for the simultaneous addition of catalyst deactivating agents or polymer additives in the polymerization of ethylene, propylene or their mixtures. Our invention especially is useful for producing polymers, such as predominantly propylene polymers, which require chemical stabilizers. Although our invention is useful in many types of polymerization processes, it is useful especially where a combination of water, neutralizing agent and antioxidant stabilizer must all be added to a molten polymer system and where there is an opportunity thereafter to flash off water and solvent components. Generally, in an olefin polymerization process, after monomer is catalytically polymerized in a reactor vessel, the polymer is transported through several process steps to a devolatilizer and then to a finisher where dry product is recovered suitable for shipping. The point at which the polymer additives and catalyst deactivation packages can be added in such a process is between the reactor vessel system and the devolatilizer. In a process where the polymer leaves the reactor in a hydrocarbon solution or dispersion the emulsion of our invention preferably is added after most of the hydrocarbon carrier is removed. Depending upon the specific process this would be after the solvent flashing steps or after centrifugation. If the polymer leaves reactor vessel system in the molten state, the requisite additive and deactivation agents can be added at any point after the polymer melt but before the devolatilizer or final drying step. In either system we prefer to inject the emulsion containing additives agents immediately before the devolatilizer. Polymer additives and catalyst deactivation agents should not be added to dry polymer. Typically at the addition point, there is sufficient material movement to thoroughly mix the polymer and emulsion, however, additional mixing can be supplied, if required.

We have found that stable liquid dispersion of the water-in-oil type containing a neutralizing agent such as calcium stearate which also acts as a dispersant and other ingredients can be injected into a mixing zone containing polymer and catalyst. The results of this process is to deactivate and neutralize the catalyst and mix the required polymer additives in one easy, precise and economic step. Although preferably all required polymer additives and catalyst deactivation agents are combined into one emulsion which can be then added to the polymerization system, within the scope of our invention is a method by which some non-compatible substances are injected into a mixing zone while others are added in separate streams. The process requirements of a specific system will dictate which method is to be used. A typical dispersion of our invention would contain 25 to 100 parts white mineral oil and/or low boiling hydrocarbon, 5 to 50 parts water, 10 to 50 parts polymer additives and an emulsifier. Low-boiling hydrocarbons such as hexane or heptane can be added in varying proportions with heavier oils to obtain compositions that resemble either a thick paste or a thick liquid. One method of forming suitable dispersion is to stir white mineral oil, calcium stearate and an oxidation inhibitor additive such as Irganox 1076 at 300°F. until the mixtures becomes very viscous. After cooling to 210°F., water can be added and the mixture whipped in a blender until a stable dispersion is formed. Hexane or heptane can be blended into this mixture until a consistency of a creamy paste is obtained. Although white mineral oil is useful in our invention, other non-aqueous substances alone can be used successfully such as low-boiling aliphatics or cycloaliphatics containing 6 to 10 carbon atoms including hexane, heptane, n-nonane and isooctane. For use in our invention, a dispersion should be stable, but not so viscous as would preclude pumping or injecting such a dispersion by some means into a mixing zone. Besides altering emulsifier characteristics, the viscosities of our emulsions can be controlled somewhat by changes in the hydrocarbon/water ratio. The addition of more hydrocarbon (e.g. heptane) makes the emulsion less viscous and more suitable for pumping.

We have found that a typical emulsion is suitable for use for 24 to 48 hours after its preparation. After that time, the emulsion sets up as a stiff grease such that during a water displacement operation the water will channel through it. However, the stiff grease would be suitable if a solid piston displacement method were used. Accordingly, the physical form of the emulsion suggests which method of injection into a polymer melt or solution should be employed.

We prefer calcium stearate as a component in a composition that is injected into a polymerization process because of its assistance in formation of a suitable dispersion and its ability to neutralize acid present in the polymer mixture. Usually traces of nonionic surfactants are added to stabilize the sytem. Additives that can be incorporated within such a dispersion include among others anti-oxidants, U.V. screens, pigments and colorants, neutralizing agents, anti-dispersants, fire retardants, and the like.

The following examples demonstrate but do not limit our invention.

EXAMPLE I

After 20 grams of calcium stearate and 20 grams of Irganox 1,076 (a oxidation inhibitor) were added to 50 milliliters of white mineral oil in a 400 milliliter beaker, the mixture was stirred and heated to 300°F. When the mixture became very viscous and difficult to stir, five drops of Igepal CO-630 was added to the mixture. After the mixture was cooled to 210°F., 50 milliliters of water containing five drops of Igepal CO-630 (a nonionic emulsifier) was added with stirring and the entire mixture was whipped in a Waring Blender. Into the resulting dispersion was added 100 milliliters of n-hexane in small increments with vigorous mixing in a Waring Blender until a creamy paste was obtained. This mixture is suitable for injection into an olefin polymerization apparatus at a point where catalyst deactivator agents and polymer additives are customarily added.

EXAMPLE II

Twenty grams of Irganox 1076 and 10 grams of calcium stearate were added to 100 milliliters of white mineral oil in a 400 milliliter beaker and the mixture was stirred and heated to 300°F. The solid materials melted and vigorous stirring was used to homogenize the mixture. This mixture was stirred while cooling and when the temperature of the composition was 210°F., 50 milliliters of water added and this mixture was blended. When it appeared that the water would not blend uniformly into the mixture, five drops of Igepal CO-630 were added with more blending to obtain a thick paste. This mixtures can be added to an olefin polymerization process as in Example I.

EXAMPLE III

Twenty grams of Irganox 1076 and 20 grams of calcium stearate were added to 50 milliliters of white mineral oil in a 400 milliliter beaker and the mixture was stirred and heated to 150°F. When 10 drops of Igepel and 50 milliliters of water were added and the mixture stirred vigorously for 5½ minutes, a thick white liquid was obtained which is suitable for injection into an olefin polymerization apparatus as in Example I.

EXAMPLE IV

Twenty grams of Irganox 1076 and 20 grams of calcium stearate were added to 50 milliliters of n-heptane. After 14 drops of Igepal CO-630 were added, the mixture was stirred and heated to 150°F. Thereupon 50 milliliters of water was added and the mixture stirred vigorously for 5 minutes until a thin white liquid was obtained which was suitable for injection into a polymerization apparatus at the point where polymerization is complete but before other devolatilization step.

EXAMPLE V

A mixture containing 1839 milliliters of n-heptane, 447.3 grams of calcium stearate, 447.3 grams of Goodrite 3114 (a phenolic stabilizer), 447.3 grams of butylated hydroxytoluene (BHT), 149.1 grams of Jonwax 12 (a color improver which was ball-milled into small particles) and 3 drops of Igepal CO-630 was stirred for 5 minutes in a Waring Blender. To this was added 893 milliliters of distilled water and the mixture was stirred vigorously for an additional 10 minutes. The resulting emulsion was poured into an upright pipe and water displaced under suitable pressure into a polypropylene melt down stream from a polymer melter in a polymerization apparatus comprising a polymerization reactor, a polymer melter, a Kenics mixer and a devolatilizer. The catalyst was deactivated and the resulting polymer contained a uniform amount of the desired additives.

EXAMPLE VI

Using the same procedure as in Example V, an emulsion was formed from 500 grams Weston 618, 750 grams Goodrite 3114, 250 grams calcium stearate, 1900 milliliters n-heptane, 3 drops Igepal and 500 milliliters distilled water. The resulting emulsion was suitable for water displacement into a polymer melt.

EXAMPLE VII

A polypropylene stabilization package was prepared by mixing by weight 1 part Jonwax 12, 3 parts BHT, 3 parts Goodrite 3114 and 3 parts calcium stearate, and then dry ball-milling the mixture into a powder. A magnetically stirred 140 milliliter beaker was charged with, in order, 50 milliliters of distilled water, 1 drop of Igepal CO-630, and 10 grams of the powdered stabilization package which was spooned in the mixture while stirring vigorously. A good stable suspension resulted.

EXAMPLE VIII

Into 50 milliliters of n-nonane in a 140 milliliter beaker was added piece meal 10.00 grams of the ball-milled stabilization package specified in Example VII while maintaining vigorous stirring. A stable suspension was obtained suitable for injection into a polymer melt. A second 10.00 grams of stabilization package was added with stirring and resulted in a stable suspension. The same result was obtained after an additional 5.00 grams of package was added. To this latter suspension was added with stirring 3.0 milliliters of distilled water in 1.0 milliliter portions. A stable suspension was obtained which did not settle or separate after 24 hours.

EXAMPLE IX

To 175 milliliters of n-octane was added 91 grams of stabilization package specified in Example VII. This mixture was mixed with a large spatula while adding 12 milliliters of distilled water and is placed in a 300 milliliter Magna-Drive stirring pressure bomb which was then topped-off with 13 milliliters of n-octane before sealing. This mixture was pumped by n-octane displacement from a Ruska pump to a propylene polymerization apparatus at a point immediately before the devolatilizer. The catalyst and the resulting polymer contained uniform quantities of additives.

EXAMPLES X-XII

Emulsions were prepared as in Example IX using varying amounts of n-octane, isooctane, water and the inhibitor package. The proportions are given in Table I.

TABLE I

| | Example X | Example XI | Example XII |
|---|---|---|---|
| Inhibitor Package (grams) | 91 | 91 | 91 |
| n-octane (milliliters) | 188 | 180 | — |
| isooctane (milliliters) | — | — | 160 |
| Water (milliliters) | 12 | 20 | 40 |

All three emulsions were injected successfully into the propylene polymerization apparatus of Example IX and yielded satisfactory product.

We claim:

1. A method for introducing a plurality of non-compatible substances comprising water, a liquid hydrocarbon and polymer additives into a molten polymer following catalytic polymerization comprising:
   a. forming a stable dispersion in which the non-compatible substances are incorporated; and
   b. injecting the dispersion into the polymer melt with mixing.

2. The method of claim 1 where the dispersion contains polymer additives and catalyst deactivation agents.

3. The method of claim 2 where the monomer is ethylene, propylene or a mixture thereof.

4. The method of claim 2 where the monomer predominantly is propylene.

5. The method of claim 3 where the dispersion comprises 5 to 50 parts water, 25 to 100 parts hydrocarbon and 10 to 50 parts polymer additives.

6. The method of claim 5 where the hydrocarbon is a mixture of white mineral oil and a low-boiling hydrocarbon.

7. The method of claim 5 where the hydrocarbon is an aliphatic or cycloaliphatic hydrocarbon containing 6 to 10 carbon atoms.

* * * * *